(12) United States Patent
Salmenkaita et al.

(10) Patent No.: US 12,407,168 B2
(45) Date of Patent: Sep. 2, 2025

(54) MANAGEMENT OF A DISTRIBUTED ENERGY STORAGE, DES, ARRANGEMENT

(71) Applicant: Elisa Oyj, Helsinki (FI)

(72) Inventors: Jukka-Pekka Salmenkaita, Helsinki (FI); Simon Holmbacka, Helsinki (FI)

(73) Assignee: Elisa Oyj, Helsinki (FI)

( * ) Notice: Subject to any disclaimer, the term of this patent is extended or adjusted under 35 U.S.C. 154(b) by 0 days.

(21) Appl. No.: 18/841,412

(22) PCT Filed: Aug. 10, 2023

(86) PCT No.: PCT/FI2023/050463
§ 371 (c)(1),
(2) Date: Aug. 26, 2024

(87) PCT Pub. No.: WO2024/047276
PCT Pub. Date: Mar. 7, 2024

(65) Prior Publication Data
US 2025/0112466 A1    Apr. 3, 2025

(30) Foreign Application Priority Data

Sep. 2, 2022 (FI) .................................... 20225769

(51) Int. Cl.
H02J 3/32 (2006.01)
(52) U.S. Cl.
CPC .............. *H02J 3/32* (2013.01); *H02J 2203/10* (2020.01)
(58) Field of Classification Search
CPC .................................................. H02J 2203/10
See application file for complete search history.

(56) References Cited

U.S. PATENT DOCUMENTS

| 11,159,020 B2 | 10/2021 | Li et al. |
| 2010/0274407 A1* | 10/2010 | Creed ............. G05B 15/02 700/295 |

(Continued)

FOREIGN PATENT DOCUMENTS

| WO | 2015059544 A2 | 4/2015 |
| WO | 2017162910 A1 | 9/2017 |

(Continued)

OTHER PUBLICATIONS

Schlund J. et al: "Increasing the Efficiency of a Virtual Battery Storage Providing Frequency Containment Reserve Power by Applying a Clustering Algorithm", IEEE 2017, 978-1-5386-4950-3/17/ $31.00.

(Continued)

*Primary Examiner* — Nathan L Laughlin
(74) *Attorney, Agent, or Firm* — Espatent Oy

(57) ABSTRACT

Managing a distributed energy storage, DES, arrangement to participate in electric grid balancing, wherein the DES arrangement comprises a pool of nodes. The method is performed by detecting (301) a balancing need for balancing the electric grid either in up direction or down direction; selecting (302) nodes for the balancing need; identifying (303) preferred balancing activity for a plurality of the selected nodes, wherein the preferred balancing activity is node specific, wherein first nodes, if any, have a preferred balancing activity in the same direction with the detected balancing need, and second nodes, if any, have a preferred balancing activity that is opposite to the detected balancing need; starting activation (304) of a balancing activity according to the balancing need for the first nodes, if any, upon detecting the balancing need; and delaying activation (305) of the balancing activity according to the balancing need for the second nodes, if any.

14 Claims, 5 Drawing Sheets

(56) References Cited

U.S. PATENT DOCUMENTS

| | | | | |
|---|---|---|---|---|
| 2015/0280458 A1* | 10/2015 | Eger | ............... | H02J 13/00004 |
| | | | | 320/101 |
| 2017/0063090 A1* | 3/2017 | Wienboeker | .......... | H02J 7/0068 |
| 2019/0173282 A1 | 6/2019 | Lelusz et al. | | |
| 2023/0080777 A1* | 3/2023 | Frenger | ............... | H02J 7/0013 |
| | | | | 307/66 |

FOREIGN PATENT DOCUMENTS

| | | | |
|---|---|---|---|
| WO | 2021148127 A1 | 7/2021 | |
| WO | 2022063908 A1 | 3/2022 | |

OTHER PUBLICATIONS

Sortomme E. et al: "Optimal Combined Bidding of Vehicle-to-Grid Ancillary Services", IEEE Transactions on Smart Grid, vol. 3, No. 1, Mar. 2012, pp. 70-79.

\* cited by examiner

401. Selecting the preferred balancing activity from up direction, down direction and no specific preference 402. Delaying activation of some or all second nodes until required activation time of the balancing need 403. Identifying the preferred balancing activity in real time 404. Identifying the preferred balancing activity based on predetermined preference information 405. Continuously monitoring changes in the balancing need and accordingly adjusting activation of nodes 406. Primarily selecting nodes that have a preferred balancing activity in the same direction with the detected balancing need 407. Starting activation of a predefined minimum capacity within a minimum response time limit 408. Sequentially activating the nodes 409. Adjusting activation power levels of the selected nodes within allowable power level limits

Fig. 4

MANAGEMENT OF A DISTRIBUTED ENERGY STORAGE, DES, ARRANGEMENT

TECHNICAL FIELD

The present disclosure generally relates to management of distributed energy storage, DES, arrangements.

BACKGROUND

This section illustrates useful background information without admission of any technique described herein representative of the state of the art.

A distributed energy storage (DES) arrangement is a pool of spatially distributed nodes controlled by a centralized control system. The nodes may be distributed over a vast geographical area. The nodes can be powered either by the electric grid or by a battery system connected to the node. The battery systems may be resources maintained for example for emergency energy backup purposes, such as backup batteries of a wireless communication network. Additionally or alternatively, the battery systems may be resources owned by households or small and medium sized companies or other smaller scale operators. A DES arrangement can be used for forming a virtual power plant (VPP) comprising a plurality of spatially distributed nodes. In this way a larger capacity may be built by pooling together smaller scale resources. As backup batteries are not constantly used, the battery systems of the nodes can be used for further optimization purposes e.g. through the VPP.

Such VPPs may participate in balancing of electric grid or in intraday trading market. Transmission system operators (TSO) offer reserve markets where reserve providers, such as VPP, can offer energy capacity for grid balancing purposes.

Now, there are provided some new considerations concerning management of distributed energy storage arrangements for the purpose of enabling participation in balancing of electric grid.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

According to a first example aspect there is provided a computer implemented method for managing a distributed energy storage, DES, arrangement to participate in electric grid balancing, wherein the DES arrangement comprises a pool of nodes. The method comprises detecting a balancing need for balancing the electric grid either in up direction or down direction;

selecting nodes for the balancing need;

identifying preferred balancing activity for a plurality of the selected nodes, wherein the preferred balancing activity is node specific, wherein first nodes, if any, have a preferred balancing activity in the same direction with the detected balancing need, and second nodes, if any, have a preferred balancing activity that is opposite to the detected balancing need;

starting activation of a balancing activity according to the balancing need for the first nodes, if any, upon detecting the balancing need; and delaying activation of the balancing activity according to the balancing need for the second nodes, if any.

In some example embodiments, the node specific preferred balancing activity is selected from up direction, down direction, and no specific preference.

In some example embodiments, the detected balancing need is associated with a required activation time and the activation of the balancing activity of at least some of the second nodes is delayed (402) until or close to the required activation time.

In some example embodiments, the preferred balancing activity is identified in real time.

In some example embodiments, the method further comprises identifying the preferred balancing activity based on predetermined preference information and periodically updating the predetermined preference information.

In some example embodiments, the method further comprises continuously monitoring changes in the balancing need and accordingly adjusting the activation of the balancing activity of the selected nodes.

In some example embodiments, selecting nodes for the balancing need comprises selecting primarily nodes that have a preferred balancing activity in the same direction with the detected balancing need.

In some example embodiments, the method further comprises that if the balancing need is related to bringing energy to batteries of the nodes, nodes that are below a target state of charge, SoC, are identified as the first nodes, and nodes above the target SoC are identified as the second nodes; and if the balancing need is related to consuming energy from the batteries of the nodes, nodes that are above the target SoC are identified as the first nodes, and nodes below the target SoC are identified as the second nodes.

In some example embodiments, the method further comprises starting activation of a predefined minimum capacity within a minimum response limit.

In some example embodiments, the method further comprises performing the activation of the nodes sequentially so that number of activated nodes gradually increases.

In some example embodiments, the method further comprises adjusting activation power levels of the selected nodes within allowable power level limits, either on individual node level or on an aggregated activation power level of the DES arrangement.

According to a second example aspect of the present invention, there is provided an apparatus comprising means for performing the method of the first aspect or any related embodiment. The means may comprise a processor and a memory including computer program code, and wherein the memory and the computer program code are configured to, with the processor, cause the performance of the apparatus.

According to a third example aspect of the present invention, there is provided a computer program comprising computer executable program code which when executed by a processor causes an apparatus to perform the method of the first aspect or any related embodiment.

According to a fourth example aspect there is provided a computer program product comprising a non-transitory computer readable medium having the computer program of the third example aspect stored thereon.

Any foregoing memory medium may comprise a digital data storage such as a data disc or diskette; optical storage; magnetic storage; holographic storage; opto-magnetic storage; phase-change memory; resistive random-access memory; magnetic random-access memory; solid-electrolyte memory; ferroelectric random-access memory; organic memory; or polymer memory. The memory medium may be formed into a device without other substantial functions than storing memory or it may be formed as part of a device with other functions, including but not limited to a memory of a computer; a chip set; and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which:

FIGS. 3-4 show flow charts according to example embodiments; and

DETAILED DESCRIPTION

Figure 1:
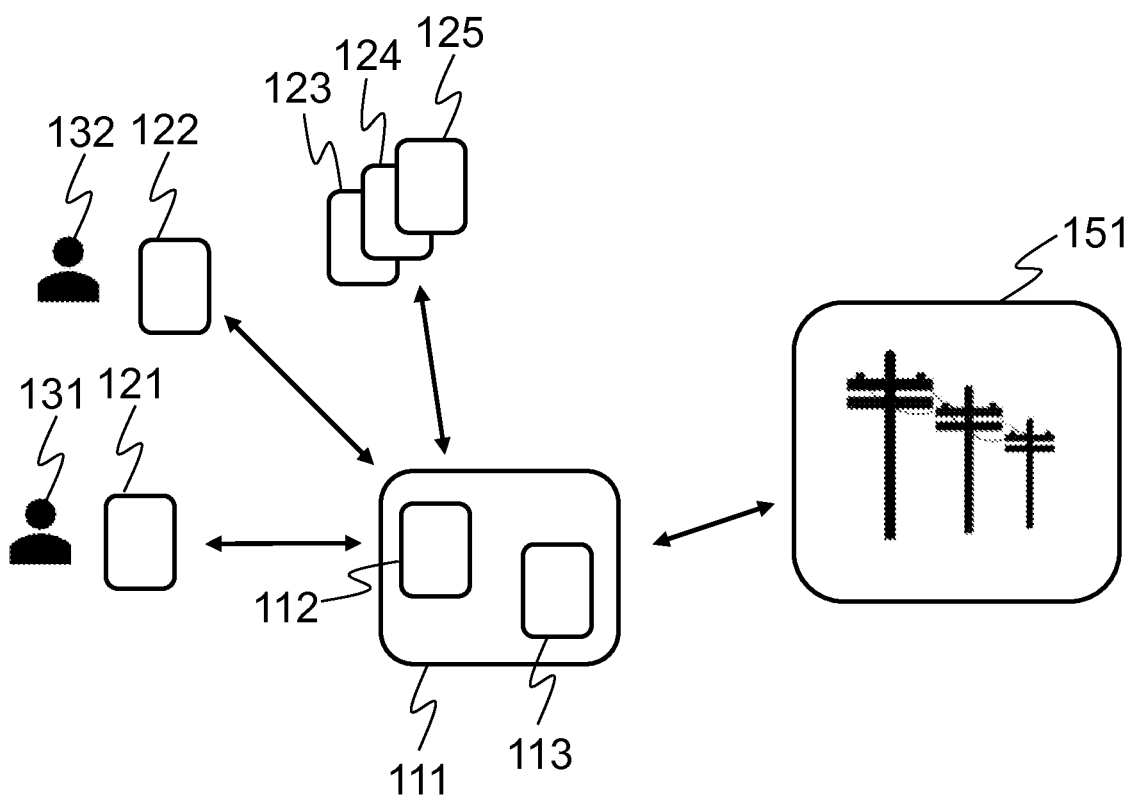
FIG. 1 schematically shows a system according to an example embodiment.

In the following description, like reference signs denote like elements or steps.

Various embodiments of present disclosure provide mechanisms to manage a distributed energy storage, DES, arrangement, wherein the DES arrangement comprises a pool of nodes. The nodes are spatially distributed entities that can be powered either by the electric grid or by a battery system connected to the node. The battery systems may be resources maintained for example for emergency energy backup purposes, such as backup batteries of a wireless communication network. Additionally or alternatively, the battery systems may be resources owned by households or small and medium sized companies or other smaller scale operators. As an alternative non-limiting example, the battery systems may be intended for storing energy from renewable sources such as solar panels and/or wind generators or even from a fuel-operated genset. As yet another alternative or additional non-limiting example, the intended use of the battery systems is optimization of self-consumption. The node may be a hybrid system using multiple energy sources.

In general, the battery systems in this disclosure refer to battery systems that are able to handle regular charge and discharge cycles. For example, lithium based batteries are such battery systems. In more detail, one or more of the following battery technologies may be represented in the pool of DES nodes: lithium-nickel-cobalt, NCA, lithium-iron-phosphate, LFP, lithium-nickel-manganese-cobalt, NMC, flow batteries, and solid-state batteries. The battery systems may have different properties with regard to price, durability, physical size and wear depending for example on the battery technology and storage capacity.

In general, lithium based batteries should not regularly exceed extreme low or high charge values. For example, state of charge below 5% or above 95% should be avoided. Such limitations should be taken into account in usage of the lithium-ion batteries to avoid increased wear of the batteries.

A DES arrangement can be used for forming a virtual power plant (VPP) comprising a plurality of spatially distributed nodes. In this way a larger capacity may be built by pooling together smaller scale resources. As backup batteries are not constantly used, the battery systems of the nodes can be used for further optimization purposes e.g. through the VPP.

Such VPPs may participate in balancing of electric grid or in intraday trading market. Transmission system operators (TSO) offer reserve markets where reserve providers, such as VPPs, can offer energy capacity for grid balancing purposes.

Frequency balancing of electric grid may be arranged for example using automatic Frequency Restoration Reserve, aFRR, or Frequency Containment Reserve, FCR, capacity market. aFRR is a centralized automatically activated reserve. Its activation is based on a power change signal calculated on the base of the frequency deviation in the Nordic synchronized area. Its purpose is to return the frequency to the nominal value. FCR is an active power reserve that is automatically controlled based on the frequency deviation. FCR may be Frequency Containment Reserve for Normal Operation, FCR-N, or Frequency Containment Reserve for Disturbances, FCR-D. Their purpose is to contain the frequency during normal operation and disturbances.

The frequency balancing may comprise up regulation and/or down regulation. Up regulation means increasing power production or decreasing consumption. Down regulation means decreasing power production or increasing consumption.

In order to participate in the grid balancing, the DES nodes need to be activated upon detecting a balancing need. The balancing need may be automatically detected or the balancing need may be signalled in a balancing request. The balancing need may relate to up regulation or down regulation.

Various embodiments of present disclosure provide a centralized coordinator for managing a DES arrangement so that the DES arrangement can be used for participating in frequency balancing of electric grid e.g. in the aFRR and/or FCR capacity market.

FIG. 1 schematically shows an example scenario according to an embodiment. The scenario shows a DES arrangement formed of a pool of nodes 121-125. The nodes 121-125 may be located at different geographical locations, but equally there may be plurality of nodes at the same location. FIG. 1 shows the nodes 123-125 at the same location and the nodes 121 and 122 individually at different locations. The nodes 121 and 122 are owned by individuals 131 and 132, respectively. The nodes 123-125 are co-located nodes owned for example by a small company. The nodes 121-125 may be intended for emergency backup purposes, but this is not mandatory. In an example embodiment, the nodes are backup batteries of a wireless communication network. In another example embodiment, the nodes are battery units of households or battery units of buildings. In an example embodiment, the nodes are co-located with an energy production unit, such as solar or wind farm. It is to be noted that this is only a non-limiting illustrative example and in practical implementations many different setups are possible.

Further, the scenario shows a coordinator system 111. The coordinator system 111 and the nodes 121-125 form a DES arrangement that may operate as a virtual power plant. Still further, FIG. 1 shows an electric grid 151.

The coordinator system 111 is configured to implement at least some example embodiments of present disclosure to manage the nodes 121-125 of the DES arrangement. For this purpose, the coordinator system 111 is operable to interact with the nodes 121-125 or equipment associated thereto. The coordinator system 111 comprises a first interface 112 for such interaction. Communication over the first interface 112 is implemented for example using Simple Network Management Protocol (SNMP). Additionally, the coordinator system 111 is operable to interact with the electric grid 151 or equipment associated thereto to coordinate participation in frequency balancing of the electric grid. The coordinator system 111 comprises a second interface 113 for this purpose.

The coordinator system 111 may receive compensation based on the frequency balancing carried out for the electric grid. The compensation may depend on actual activation of frequency balancing and/or on reserving capacity for the possible frequency balancing needs. Further, there may be penalty, if the DES arrangement fails to fulfil the frequency balancing commitments. Therefore, there is an incentive to fulfil the commitments made. Sometimes failing to fulfil the commitments made may be acceptable, though.

Figure 2:
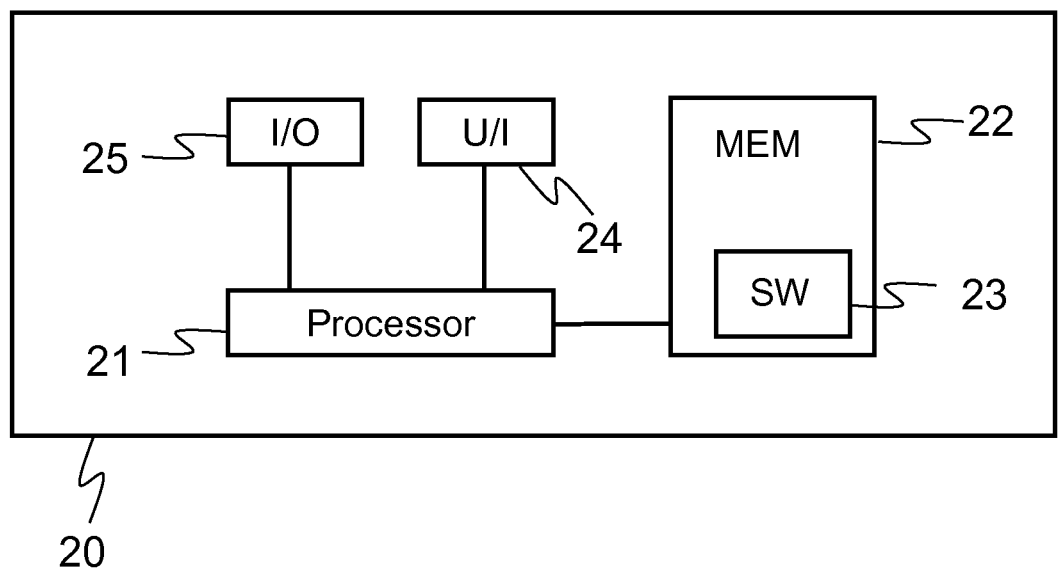
FIG. 2 shows a block diagram of an apparatus according to an example embodiment.

FIG. 2 shows a block diagram of an apparatus 20 according to an embodiment. The apparatus 20 is for example a general purpose computer, cloud computing environment or some other electronic data processing apparatus. The apparatus 20 can be used for implementing at least some embodiments of present disclosure. That is, with suitable configuration the apparatus 20 is suited for operating for example as the coordinator system 111 of FIG. 1.

The apparatus 20 comprises a communication interface 25; a processor 21; a user interface 24; and a memory 22. The apparatus 20 further comprises software 23 stored in the memory 22 and operable to be loaded into and executed in the processor 21. The software 23 may comprise one or more software modules and can be in the form of a computer program product.

The processor 21 may comprise a central processing unit (CPU), a microprocessor, a digital signal processor (DSP), a graphics processing unit, or the like. FIG. 2 shows one processor 21, but the apparatus 20 may comprise a plurality of processors.

The user interface 24 is configured for providing interaction with a user of the apparatus. Additionally or alternatively, the user interaction may be implemented through the communication interface 25. The user interface 24 may comprise a circuitry for receiving input from a user of the apparatus 20, e.g., via a keyboard, graphical user interface shown on the display of the apparatus 20, speech recognition circuitry, or an accessory device, such as a headset, and for providing output to the user via, e.g., a graphical user interface or a loudspeaker.

The memory 22 may comprise for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories. The memory 22 may serve the sole purpose of storing data, or be constructed as a part of an apparatus 20 serving other purposes, such as processing data.

The communication interface 25 may comprise communication modules that implement data transmission to and from the apparatus 20. The communication modules may comprise a wireless or a wired interface module(s) or both. The wireless interface may comprise such as a WLAN, Bluetooth, infrared (IR), radio frequency identification (RFID), GSM/GPRS, CDMA, WCDMA, LTE (Long Term Evolution) or 5G radio module. The wired interface may comprise such as Ethernet or universal serial bus (USB), for example. The communication interface 25 may support one or more different communication technologies. The apparatus 20 may additionally or alternatively comprise more than one of the communication interfaces 25.

A skilled person appreciates that in addition to the elements shown in FIG. 2, the apparatus 20 may comprise other elements, such as displays, as well as additional circuitry such as memory chips, application-specific integrated circuits (ASIC), other processing circuitry for specific purposes and the like.

Figure 3:
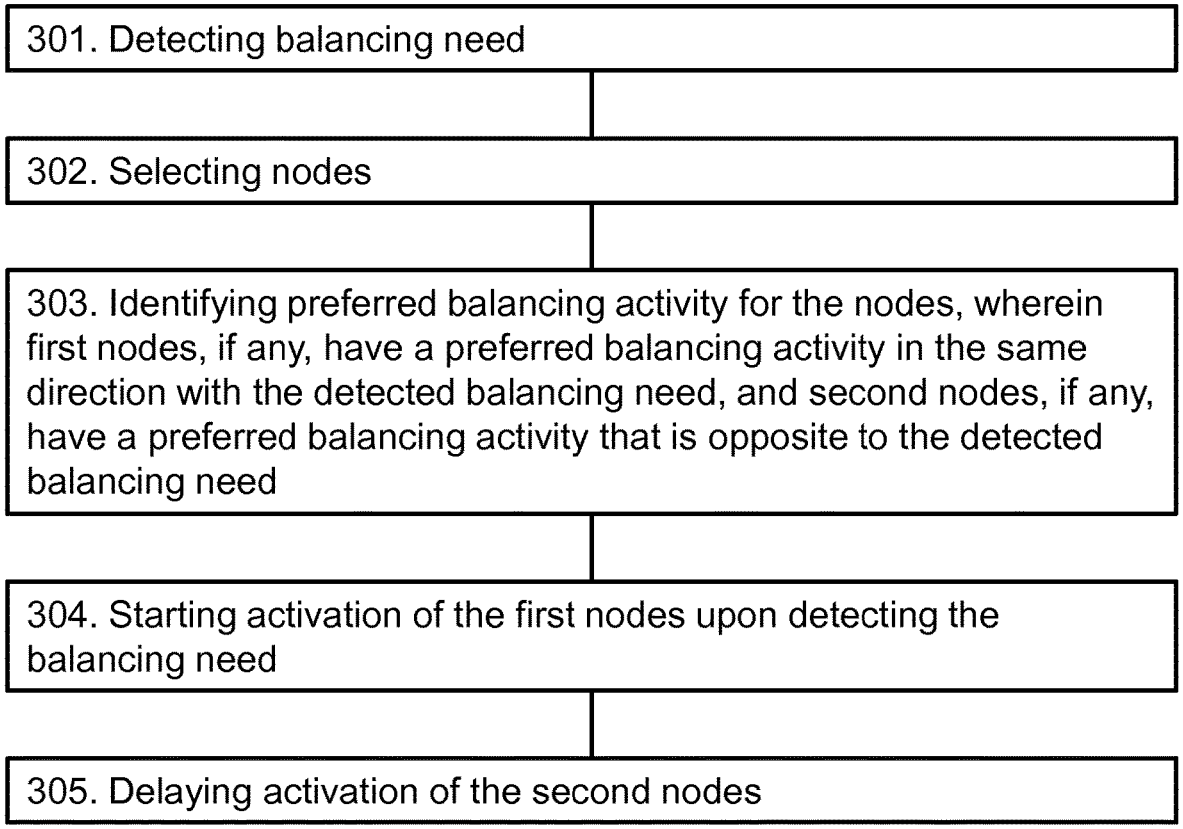

FIGS. 3 and 4 show flow charts according to example embodiments. FIGS. 3 and 4 illustrate processes comprising various possible steps including some optional steps while also further steps can be included and/or some of the steps can be performed more than once. The processes may be implemented in the coordinator system 111 of FIG. 1 and/or in the apparatus 20 of FIG. 2. The processes are implemented in a computer program code and does not require human interaction unless otherwise expressly stated. It is to be noted that the processes may however provide output that may be further processed by humans and/or the processes may require user input to start.

FIG. 3 shows an example method on a more generic level and FIG. 4 shows some optional details.

The process of FIG. 3 comprises the following steps:

301: A balancing need is detected. The balancing need relates to frequency balancing of an electric grid. The balancing need may relate to up regulation (up direction) or down regulation (down direction). The balancing need has a capacity requirement associated thereto. The capacity requirement may be a predefined value or the capacity requirement may vary. The balancing need may depend on balancing commitment made for nodes of a DES arrangement.

Further, the balancing need has a required activation time associated thereto. The required activation time defines a time period during which the required capacity needs to be activated in order to meet the balancing need. The required activation time may be a predefined value. In an example case the required activation time is 300 seconds, but significantly shorted and longer required activation times are possible, too. Sometimes the required activation time may include multiple requirements, such as a minimum response limit for activation of a certain portion of the required capacity (e.g. 30 seconds) and longer time period for activation of full capacity (e.g. 300 seconds).

The balancing need may be detected based on receiving a balancing request requesting activation of energy sources. The capacity requirement may be signaled in the balancing request. Alternatively, the balancing need may be detected based on monitoring the electric grid.

302: Nodes are selected for the balancing need. That is, a plurality of nodes of the DES arrangement are selected for fulfilling the capacity requirement associated with the balancing need.

The selection may be implemented by randomly choosing enough nodes to fulfil the capacity requirement or there may be some logic in choosing the nodes. Additionally or alternatively, the selection may be based on properties of battery systems of the nodes, such as battery wear profile, available capacity, type of the battery system, reliability of the battery system, operating conditions of the battery system (e.g. temperature and humidity).

303: A preferred balancing activity is identified for a plurality of the selected nodes. The preferred balancing activity is node specific, that is, the preferred balancing activity is independently identified for different nodes and different nodes may have different preference. First nodes, if any, have a preferred balancing activity in the same direction with the detected balancing need, and second nodes, if any, have a preferred balancing activity that is opposite to the detected balancing need. It is to be noted that a particular set of selected nodes may not always include both first and second nodes. Further there may be nodes that are not identified as first nodes or second nodes. For example, there may be nodes for which both directions suit equally well.

Identification of the preferred balancing activity may be based on a target state of charge, SoC, of the individual nodes.

The target SoC can be defined for example as a desired level of SoC at which the battery of the node is capable of both charging and discharging sufficient amount of energy. The target SoC may be a static predefined value that may be periodically updated. Alternatively, the target SoC may be a dynamically determined value.

The target SoC may be determined based on balancing commitments and/or predefined operating objectives of the nodes of the DES arrangement. Further, the intended use of the individual nodes may affect the target SoC. E.g. backup batteries of wireless network in general need to have predefined capacity available for emergency situations.

In an example case, if the balancing need is related to bringing energy to batteries of the nodes, nodes that are below the target SoC are identified as the first nodes, and nodes above the target SoC are identified as the second nodes. Correspondingly, if the balancing need is related to consuming energy from the batteries of the nodes, nodes that are above the target SoC are identified as the first nodes, and nodes below the target SoC are identified as the second nodes.

304: Activation of a balancing activity according to the balancing need is started for the first nodes upon detecting the balancing need, if any first nodes have been identified. It is to be noted that starting activation of the first nodes does not necessarily mean that all first nodes are immediately activated. Instead, e.g. sequential activation may be performed.

305: Activation of the balancing activity according to the balancing need is delayed for the second nodes, if any second nodes have been identified. That is, activation of the second nodes is not started immediately upon detecting the balancing need. Instead, flexibility that a required activation time of the balancing need may offer is taken advantage of. Such flexibility is available if the time needed for activating a node is shorter than the required activation time mandated by the balancing need. For example, if the required activation time is 300 seconds and activation of an individual node takes 5 seconds, there is up to 295 seconds flexibility to arrange the activations.

It is to be noted that depending on the implementation the exact activation time of the second nodes may vary. That is, some of the second nodes may be delayed less than others.

By steps 304 and 305 one achieves that desired activations are performed fast, and undesired activations may be delayed whilst still meeting the balancing commitment of the DES arrangement.

The process of FIG. 4 comprises the following steps each of which may be practiced individually or in any suitable combination with other steps of FIG. 4 or FIG. 3:

401: The node specific preferred balancing activity is selected from up direction, down direction, and no specific preference. This may be implemented in the step 303 of FIG. 3.

The nodes with no specific preference may be activated upon detecting the balancing need or activation thereof may be delayed.

402: The required activation time of the detected balancing need is taken into account in activation of the second nodes and the activation of the balancing activity of at least some of the second nodes is delayed until or close to the required activation time. In an embodiment each second node is delayed until or close to the required activation time. This may be implemented in the step 305 of FIG. 3.

403: The preferred balancing activity is identified in real time. In this way real time operating context of the nodes can be taken into account. This may be implemented in the step 303 of FIG. 3.

404: As an alternative or an addition to step 403, the preferred balancing activity is identified based on predetermined preference information. The predetermined preference information may be periodically updated to match current operating conditions. This may be implemented in the step 303 of FIG. 3.

405: Changes in the balancing need are continuously monitored and the activation of the balancing activity of the selected nodes is accordingly adjusted. In this way especially delayed activations may be adjusted to match current balancing need. For example, if the balancing need decreases, some planned activations may be cancelled. In this way it may be possible to avoid activating balancing activity in an undesired direction.

406: Primarily nodes that have a preferred balancing activity in the same direction with the detected balancing need are selected. In this way, the need to perform activating balancing activity in an undesired direction may be reduced. This may be implemented in the step 302 of FIG. 3.

407: Activation of a predefined minimum capacity is started within a minimum response limit. There may be e.g. 30 second time limit for activation of a certain portion of the required capacity. This kind of minimum response limit may be set to override the delayed activations in step 305 of FIG. 3 so that the minimum response limit is met, and delayed activations are arranged only after that.

408: The nodes may be sequentially activated. This may be applied to the first nodes and/or to the second nodes. This may be implemented in the steps 304 and/or 305 of FIG. 3. In this way, the number of activated nodes gradually increases.

409: Activation power levels of the selected nodes are adjusted within allowable power level limits. In general, some flexibility may be allowed in acceptable activation power levels (e.g. +−5%). Adjustment of the activation power levels may be beneficial especially if there is a need to perform activations in an undesired direction. E.g. if the SoC level of certain nodes is too low or too high, further deviation from the target SoC level may be reduced by adjustment of the activation power levels in addition to adjusting timing of the activations as defined in step 305 of FIG. 3.

The power level adjustment may be performed on individual node level. Alternatively, the power level adjustment may be performed on aggregated activation power level of the DES arrangement. The aggregated activation power level may be better suited for ensuring that the balancing commitment is met.

FIGS. 5-8 show graphs of some example cases. It is to be noted that these are simplified non-limiting examples. Maximum delay in the shown example is 100 seconds.

Figure 5:
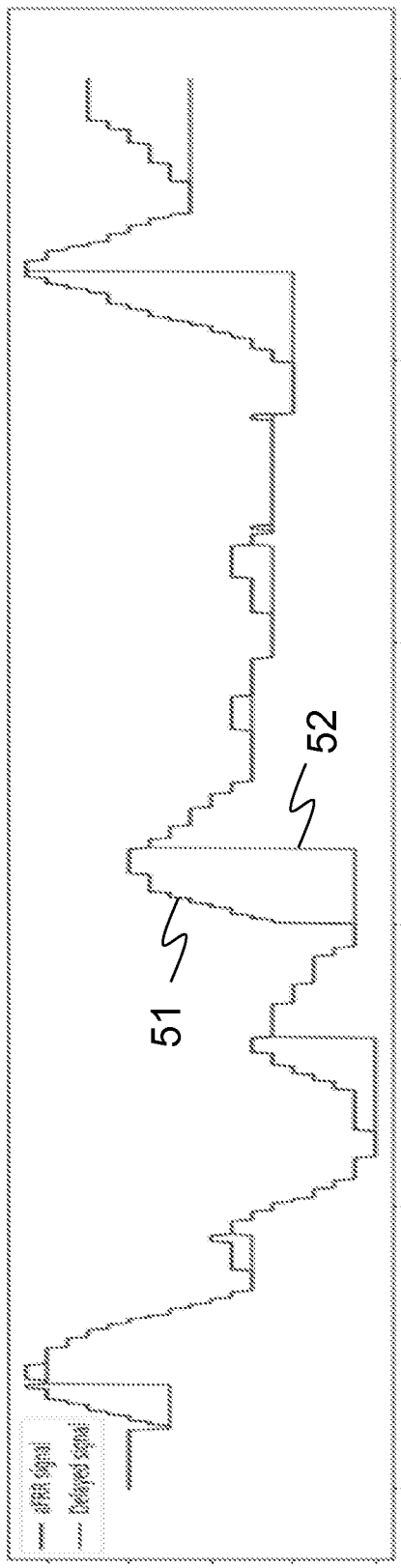
FIGS. 5-8 show graphs of some example cases.

FIG. 5 shows an example where more down regulation is preferred in the nodes. Line 51 shows an aFRR signal defining requested activation (the balancing need) and line 52 shows the performed activations (a delayed signal including delayed activations according to one or more embodiments of present disclosure). It can be seen that there is a stepwise delay of activation in up direction (the undesired direction in this example).

Figure 6:
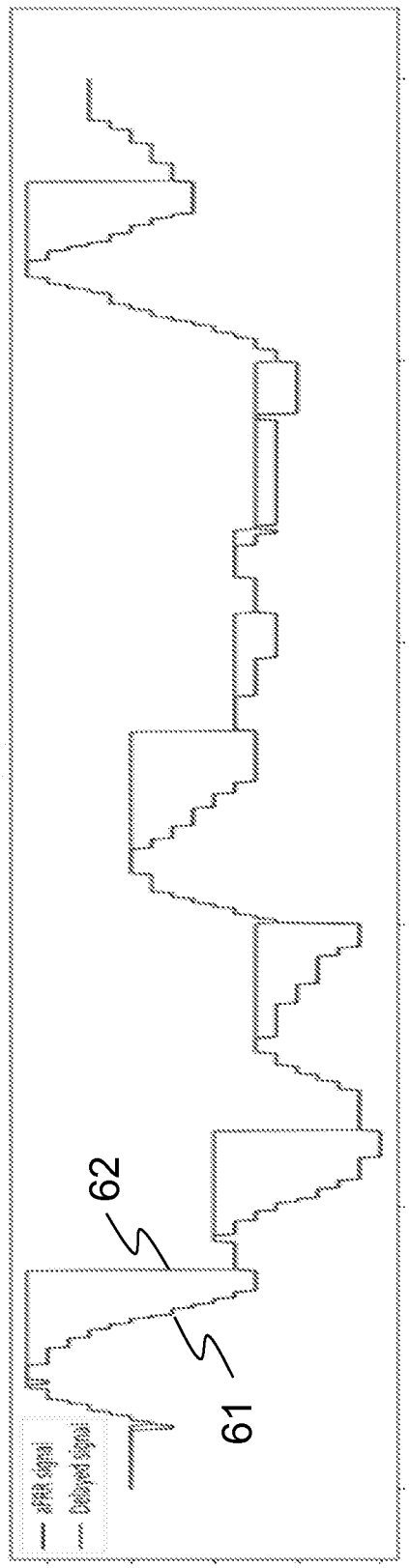

FIG. 6 shows an example where more up regulation is preferred in the nodes. Line 61 shows an aFRR signal defining requested activation (the balancing need) and line 62 shows the performed activations (a delayed signal including delayed activations according to one or more embodiments of present disclosure). It can be seen that there is a stepwise delay of activation in down direction (the undesired direction in this example).

Figure 7:
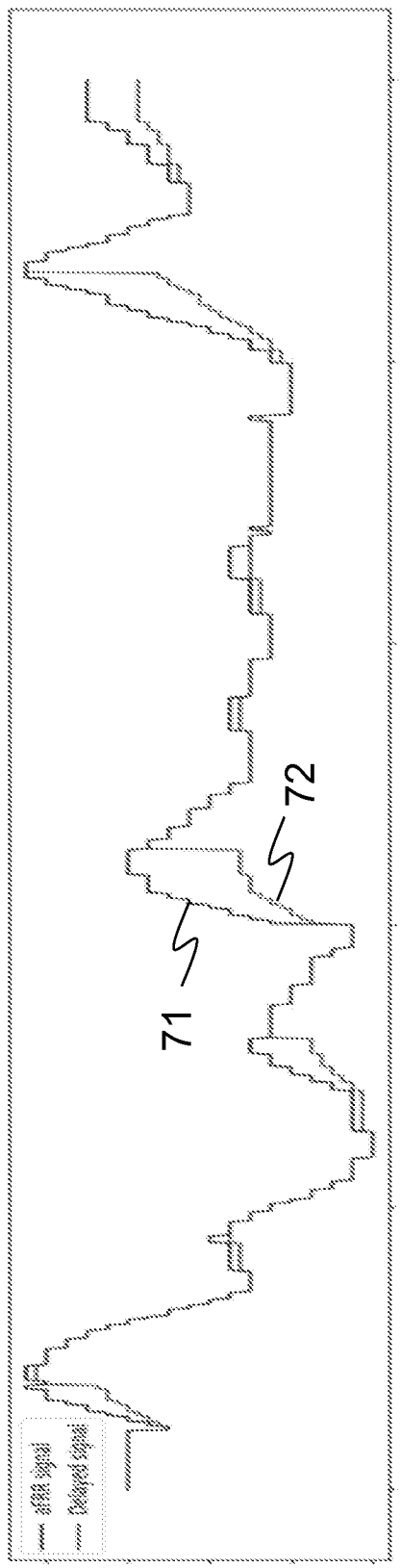

FIG. 7 shows an example where more down regulation is preferred in the nodes. Line 71 shows an aFRR signal defining requested activation (the balancing need) and line 72 shows the performed activations (a delayed signal including delayed activations according to one or more embodiments of present disclosure). It can be seen that there is a rolling or gradual delay of activation in up direction (the undesired direction in this example).

Figure 8:
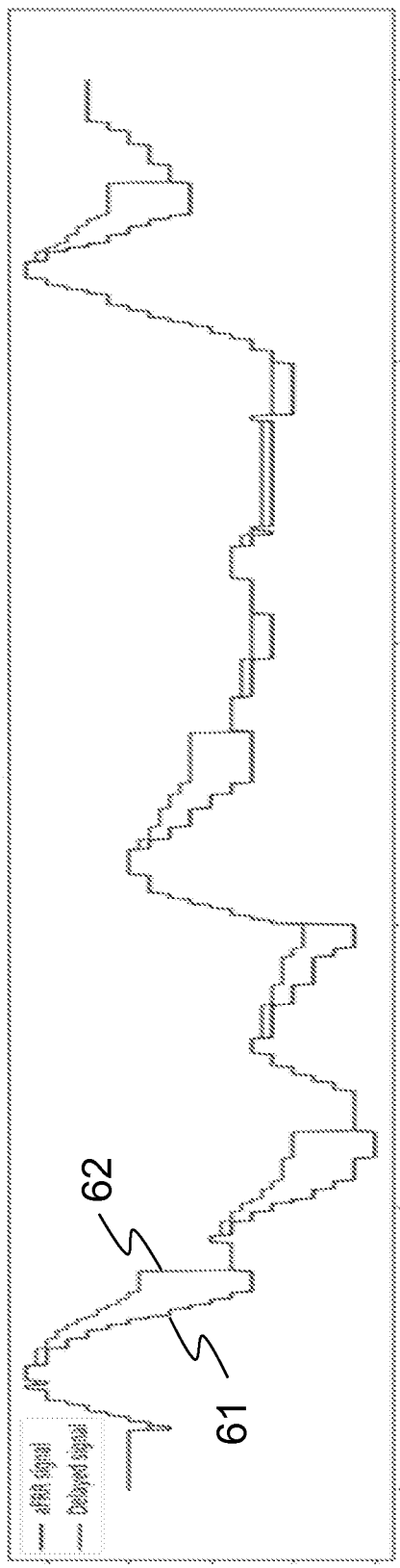

FIG. 8 shows an example where more up regulation is preferred in the nodes. Line 81 shows an aFRR signal defining requested activation (the balancing need) and line 82 shows the performed activations (a delayed signal including delayed activations according to one or more embodiments of present disclosure). It can be seen that there is a rolling or gradual delay of activation in down direction (the undesired direction in this example).

Without in any way limiting the scope, interpretation, or application of the appended claims, a technical effect of one or more of the example embodiments disclosed herein is improved management of a DES arrangement or a virtual power plant, VPP. For example, risks of being unable to fulfil grid balancing commitments or otherwise set targets may be alleviated by delaying undesired activations in a controlled manner. In this way, one achieves a hybrid of centralized control of the DES arrangement and individual control of nodes of the DES arrangement. Consequently, ability to efficiently use DES arrangement may be improved. Efficient usage of already existing energy resources may provide environmental benefits.

It is to be noted that novelty of present embodiments may be partially based on identification of the problems arising from heterogenous nodes of a VPP. In large power generation units, such as hydro power plants, the whole unit is straightforwardly controlled to provide either up regulation, down regulation or not participating in regulation at all. As the purpose of VPPs is in general to mimic operation of large power generation units, a straightforward solution is to control the VPP as one big unit the same way as large power generation units. The need for fine tuning the operation of individual nodes of a VPP may not be straightforwardly identified by a skilled person. The inventors of present embodiments have however identified that requirements in managing VPPs are different from managing large power generation units and have invented embodiments that are particularly suited for managing DES arrangement or a virtual power plant, VPP, formed of a plurality of smaller scale nodes with heterogenous properties and thereby possibly diverging capabilities to participate in regulation actions.

Any of the afore described methods, method steps, or combinations thereof, may be controlled or performed using hardware; software; firmware; or any combination thereof. The software and/or hardware may be local; distributed; centralised; virtualised; or any combination thereof. Moreover, any form of computing, including computational intelligence, may be used for controlling or performing any of the afore described methods, method steps, or combinations thereof. Computational intelligence may refer to, for example, any of artificial intelligence; neural networks; fuzzy logics; machine learning; genetic algorithms; evolutionary computation; or any combination thereof.

Various embodiments have been presented. It should be appreciated that in this document, words comprise; include; and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A computer implemented method for managing a distributed energy storage, DES, arrangement to participate in electric grid balancing, wherein the DES arrangement comprises a pool of nodes; the method comprising
   detecting a balancing need for balancing the electric grid either in up direction or down direction;
   selecting nodes for the balancing need, wherein the selection is based on randomly choosing nodes, using a logic in choosing the nodes and/or selecting the nodes based on properties of battery systems of the nodes;
   identifying preferred balancing activity for a plurality of the selected nodes, wherein the preferred balancing activity is node specific, wherein first nodes have a preferred balancing activity in the same direction with the detected balancing need, and second nodes have a preferred balancing activity that is opposite to the detected balancing need;
   starting activation of a balancing activity according to the balancing need for the first nodes upon detecting the balancing need; and
   delaying activation of the balancing activity according to the balancing need for the second nodes wherein said delaying takes into account a required activation time of the detected balancing need.

2. The method of claim 1, wherein the node specific preferred balancing activity is selected from up direction, down direction, and no specific preference.

3. The method of claim 1, wherein the detected balancing need is associated with a required activation time and the activation of the balancing activity of at least some of the second nodes is delayed until the required activation time.

4. The method of claim 1, further comprising identifying the preferred balancing activity in real time.

5. The method of claim 1, further comprising identifying the preferred balancing activity based on predetermined preference information and periodically updating the predetermined preference information.

6. The method of claim 1, further comprising continuously monitoring changes in the balancing need and accordingly adjusting the activation of the balancing activity of the selected nodes.

7. The method of claim 1, wherein selecting nodes for the balancing need comprises selecting primarily nodes that have a preferred balancing activity in the same direction with the detected balancing need.

8. The method of claim 1, wherein
if the balancing need is related to bringing energy to batteries of the nodes, nodes that are below a target state of charge, SoC, are identified as the first nodes, and nodes above the target SoC are identified as the second nodes; and
if the balancing need is related to consuming energy from the batteries of the nodes, nodes that are above the target SoC are identified as the first nodes, and nodes below the target SoC are identified as the second nodes.

9. The method of claim 1, further comprising starting activation of a predefined minimum capacity within a minimum response limit.

10. The method of claim 1, further comprising performing the activation of the nodes sequentially so that number of activated nodes gradually increases.

11. The method of claim 1, further comprising adjusting activation power levels of the selected nodes within allowable power level limits, either on individual node level or on an aggregated activation power level of the DES arrangement.

12. The method of claim 1, wherein detecting a balancing need for balancing the electric grid comprises detecting a frequency balancing need.

13. An apparatus comprising a processor and a memory including computer program code, wherein the memory and the computer program code are configured to, with the processor, cause the apparatus to perform the method of claim 1.

14. A non-transitory computer readable medium having stored thereon a computer program comprising computer executable program code which when executed in an apparatus comprising a processor and a memory including computer program code, wherein the memory and the computer program code are configured to, with the processor, cause the apparatus to perform the method of claim 1.

* * * * *